United States Patent [19]

Liu

[11] Patent Number: 5,644,087
[45] Date of Patent: Jul. 1, 1997

[54] ROTATIONAL SHOCK VIBRATION FIXTURE

[76] Inventor: Hong S. Liu, 284 Moraga Wayu, San Jose, Calif. 95119

[21] Appl. No.: 667,094

[22] Filed: Jun. 20, 1996

[51] Int. Cl.$^6$ ........................................ B06B 3/00
[52] U.S. Cl. .................. 73/663; 73/865.6; 73/432.1; 73/DIG. 1
[58] Field of Search ........................ 73/571, 663, 664, 73/665, 666, 667, 668, 672, 865.3, 865.6, 432.1, DIG. 1

[56] References Cited

U.S. PATENT DOCUMENTS

| | | | |
|---|---|---|---|
| 2,697,343 | 12/1954 | Hirtreiter | 73/663 |
| 4,061,019 | 12/1977 | Blasetti | 73/662 |
| 4,265,123 | 5/1981 | Cappel | 73/663 |
| 4,385,524 | 5/1983 | Cappel | 73/663 |
| 4,446,742 | 5/1984 | Thompson, Jr. et al. | 73/663 |
| 4,875,374 | 10/1989 | Pinson | 73/663 |
| 5,309,766 | 5/1994 | Touzeau et al. | 73/663 |

FOREIGN PATENT DOCUMENTS 426159 10/1974 U.S.S.R. ........................ 73/663

*Primary Examiner*—Hezron E. Williams
*Assistant Examiner*—Rose M. Miller
*Attorney, Agent, or Firm*—Donald E. Schreiber

[57] ABSTRACT

A rotational shock/vibration fixture that adapts a rectilinear shock or vibration apparatus for applying a rotary shock or vibration to a device undergoing test. A rotatable device-mounting-plate, enclosed within a rigid box, receives the device. A pair of diametrically opposed bearings support the box within a frame for movement about a rotation axis. Coil springs stretching between the box and the frame establish a rest orientation for the box with respect to the frame, and dampens oscillations of the box. A reduced backlash linkage between the box to the rectilinear shock or vibration apparatus couples rectilinear movement of the shock or vibration apparatus into rotary shock or vibration of the box. The reduced-backlash linkage may include a lever arm for mechanically amplifying shock applied by the shock or vibration apparatus.

14 Claims, 4 Drawing Sheets

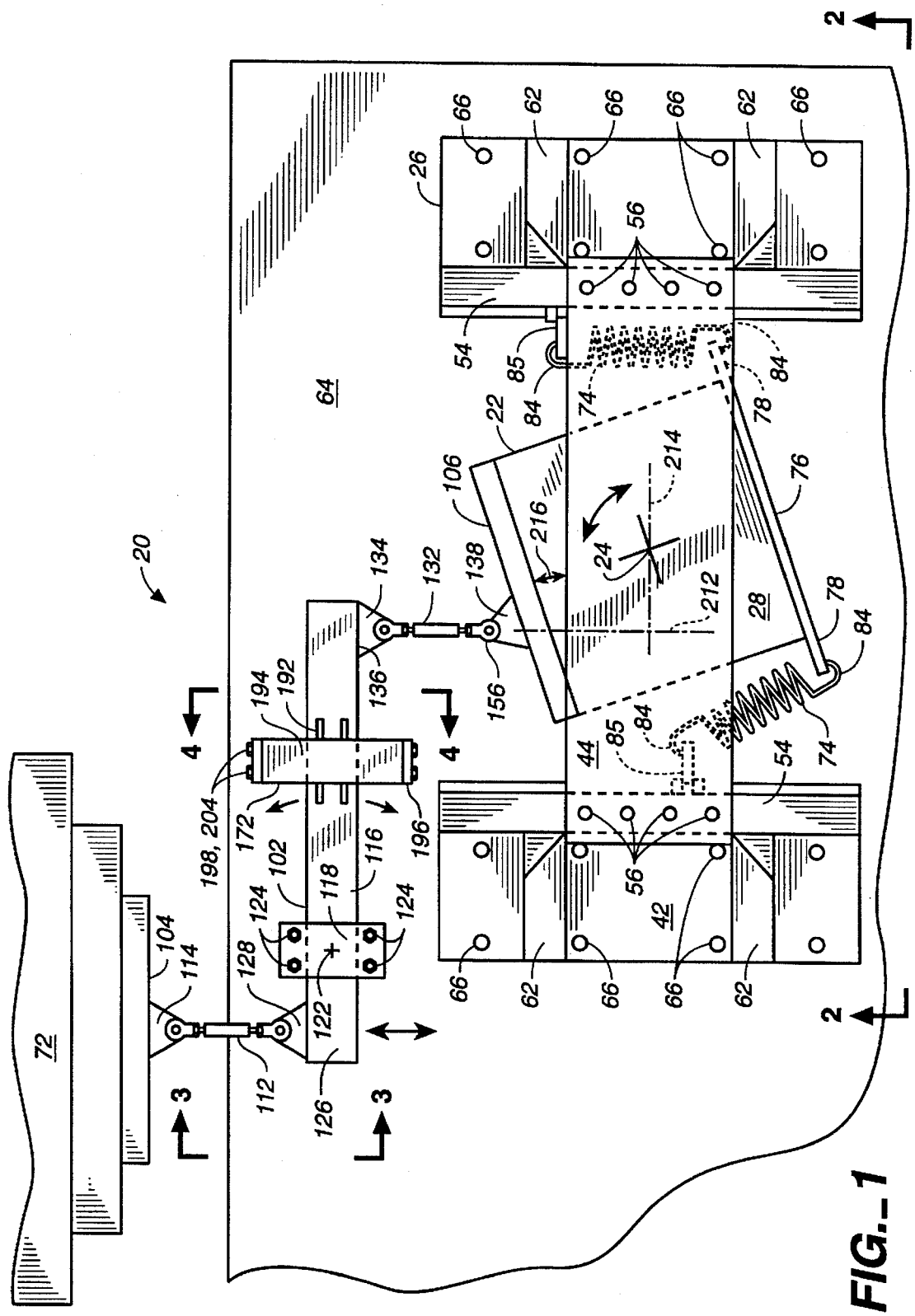
FIG._1

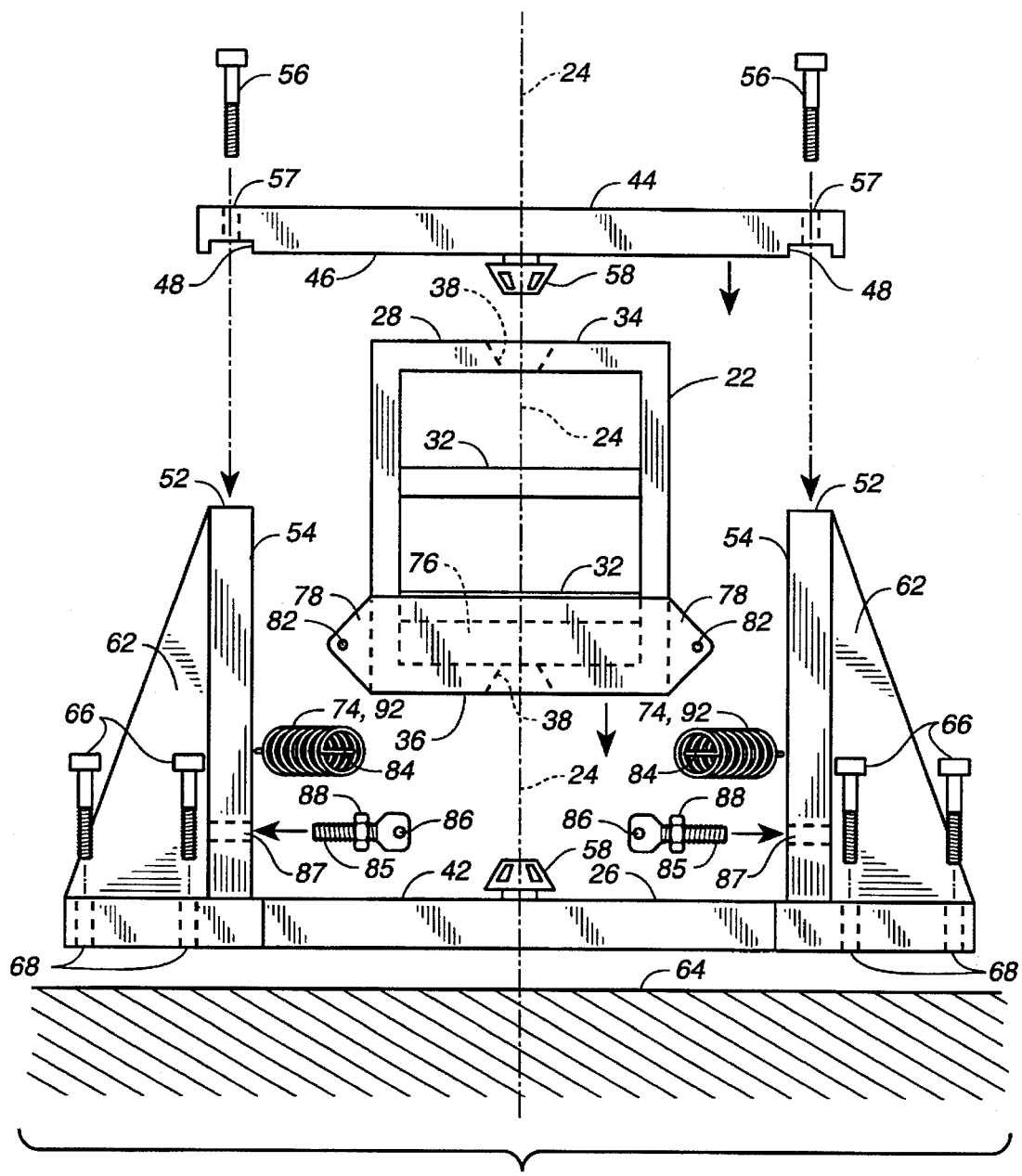
FIG._2

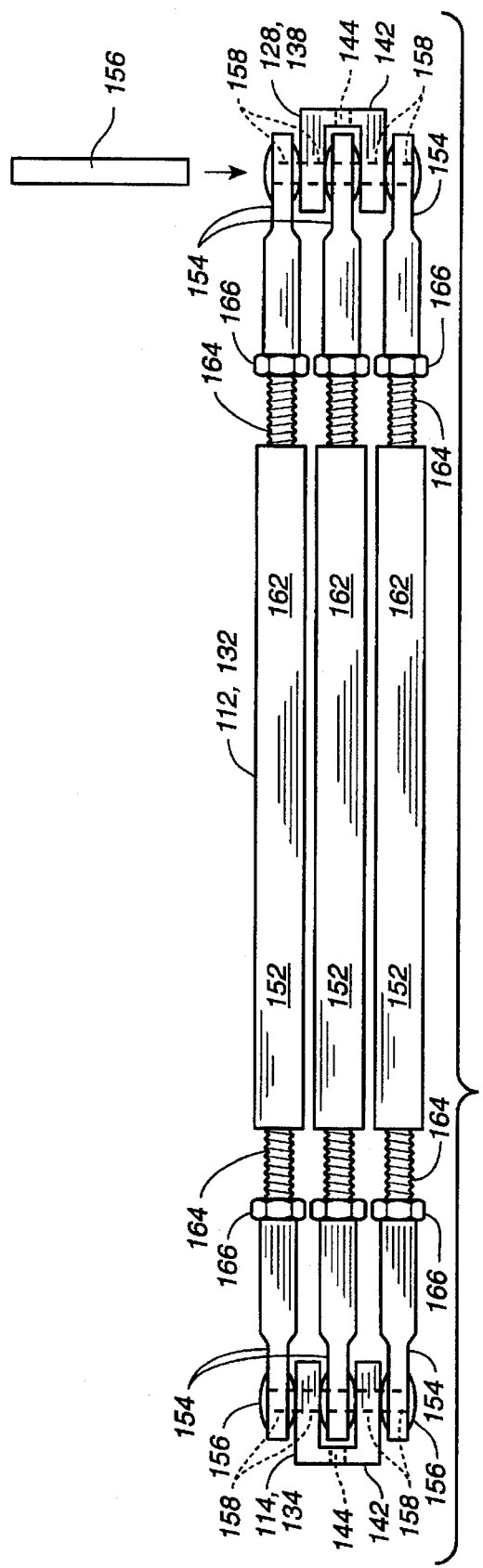
FIG._3
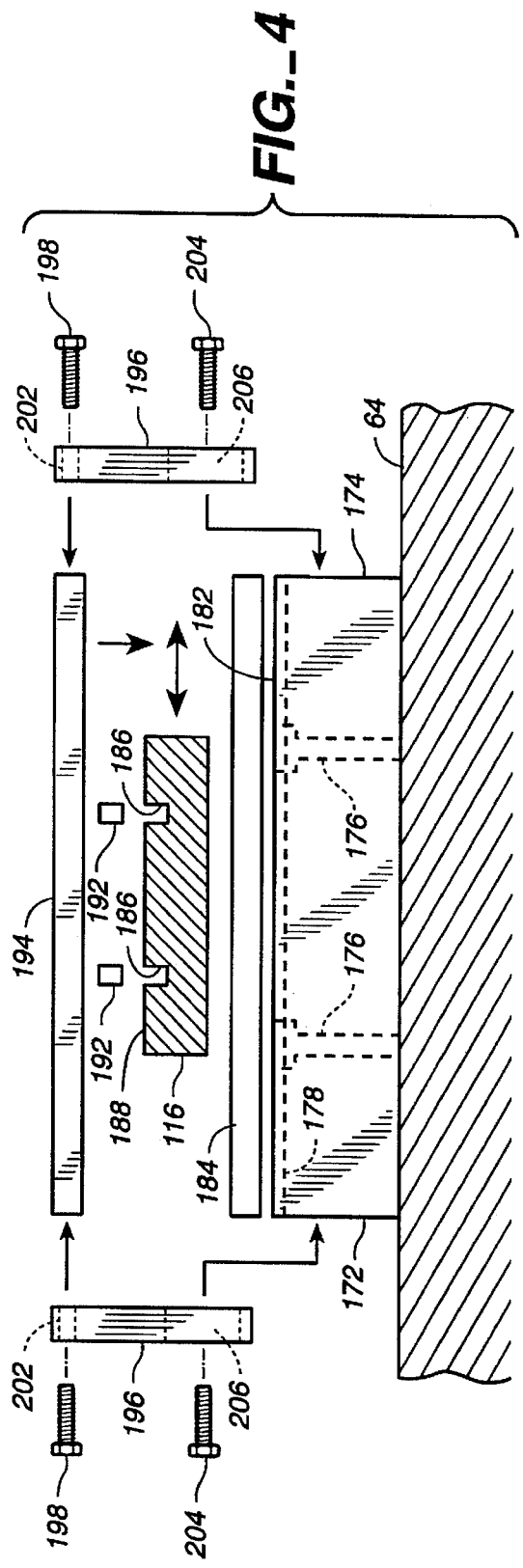
FIG._4

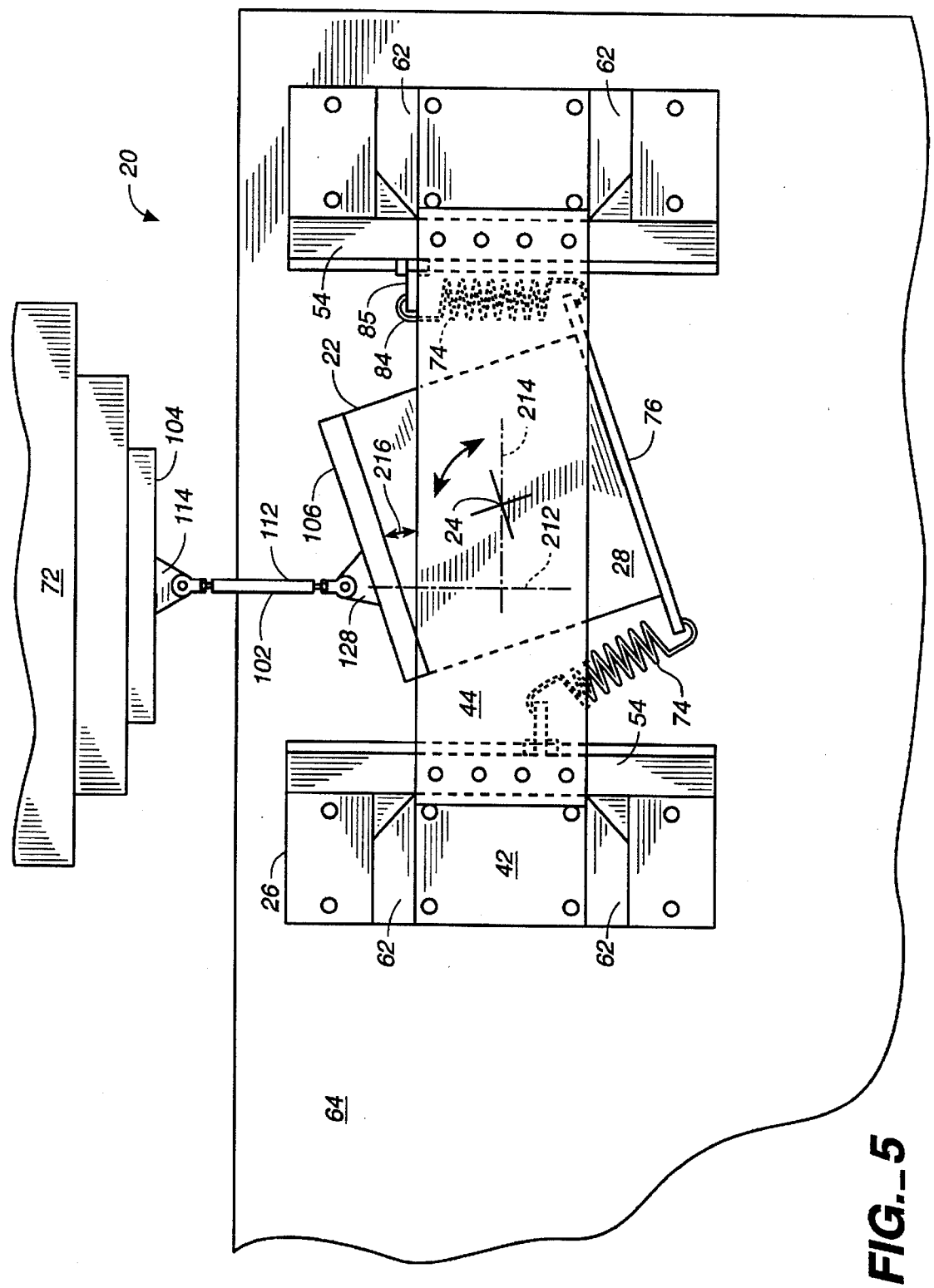
FIG._5

ROTATIONAL SHOCK VIBRATION FIXTURE

BACKGROUND OF THE INVENTION

1. Field of the Invention

The present invention relates generally to environmental testing and, more particularly, to fixtures used in vibration testing.

2. Description of the Prior Art

Rectilinear vibration testing of devices to assure operation in their intended environment is a well established industrial practice. In performing such vibration testing, generally a device is secured to a fixture that is mechanically coupled to a source of rectilinear vibration, e.g. a pneumatically, electro-magnetically or hydraulically energized shaker driver. Recently, however, manufacturers have become concerned that rotational vibration and/or shock, as contrasted with rectilinear vibration and/or shock, may cause certain types of device failures, particularly for digital computer disk drives.

Presently, it appears that there exist several different commercial systems for applying a rotational shock to a device under test. One type of rotational shock system employs a spring-loaded plunger which, upon being released, strikes a pivoted plate to which is secured the device undergoing test. An alternative type of rotational shock system employs a plate that pivots about a horizontal axis to which is secured the device undergoing test. When released, the plate rotates downward until hitting a mechanical stop. The advantages of such rotational shock testing devices are that they are relatively simple to design, and they are relatively inexpensive. However, these different types of rotational shock testing devices have several disadvantages. First, it is difficult to control the strength of the applied shock, and therefore the systems exhibit poor repeatability. Second, the systems are capable of applying only a single, relatively weak shock having a duration that is difficult to adjust or control. Lastly, these systems are incapable of applying rotary vibration to a device undergoing test.

SUMMARY OF THE INVENTION

An object of the present invention is to provide an apparatus that provides a well controlled rotational shock or vibration to a device undergoing test.

Another object of the present invention is to repeatably shock or vibrate a device undergoing test.

Another object of the present invention is to provide rotational shock or vibration to a device undergoing test which has an adjustable range of characteristics, such as duration, strength and repetition, and to repeatably perform such testing.

Another object of the present invention is to provide high angular acceleration shock or vibration to a device undergoing test.

Yet another object of the present invention is to adapt a rectilinear shock or vibration apparatus for applying rotational shock or vibration to a device undergoing test.

Briefly, the present invention is a rotational shock/vibration fixture that adapts a rectilinear shock or vibration apparatus for applying a rotary shock or vibration to a device undergoing test. The rotational shock/vibration fixture includes a rotatable device-mounting-plate for receiving the device to be tested. In a preferred embodiment, the rotatable device-mounting-plate is supported within a rigid box. The rigid box is supported, in turn, by bearings that are located on diametrically opposite sides of the box, and interposed between the box and a supporting frame. The bearings permit motion of the box about an axis of rotation established by the bearings. The frame and bearings also hold the axis of rotation fixed with respect to the rectilinear shock or vibration apparatus. In the preferred embodiment, the box is also coupled to the frame by coil springs stretching between the box and the frame. The coil springs establish a rest orientation for the box with respect to the frame to which the box returns if no external force is applied to the box, and dampen oscillations of the box during testing.

The rotational shock/vibration fixture also includes a linkage having a linear-motion end that is secured to the rectilinear shock or vibration apparatus. The linkage also has a rotary-motion end which, in the preferred embodiment, is secured to the outer surface of the box. Attachment of the linkage's rotary-motion end to the box couples the linkage to the rotatable device-mounting-plate within the box. Thus, the linkage couples rectilinear movement of the rectilinear shock or vibration apparatus to the box, including the device-mounting-plate, to thereby induce rotary motion of the device-mounting-plate about the axis of rotation. In the preferred embodiment, the linkage is formed by a structure having reduced mechanical backlash.

In one embodiment of the invention, the reduced-backlash linkage includes primarily an elongated hinged-link. The hinged-link has a pair of yokes disposed respectively at opposite ends of the hinged-link. The hinged-link also includes at least three elongated rods each of which has rod-ends disposed at opposite ends of the rod. Each rod-end is secured to one of the yokes by a pin which passes through apertures piercing both the yoke and the rod-end. At least one of the rods has an adjustable length which is fixed so at least one of the three rods is taut while at least another of the three rods is compressed. Compressing at least one of the three rods while applying tension to one of the other rods reduces backlash in the hinged-link.

In an alternative embodiment of the invention, the reduced-backlash linkage preferably includes a pair of elongated hinged-links such as those described above. A first link-end of a first one of the pair of hinged-links is coupled to the rectilinear shock or vibration apparatus to thereby constitute the linear-motion end of said linkage. A second link-end of the first hinged-link connects to a lever arm that is supported by a lever-arm frame for rotation about a pivot axis. Both the lever-arm frame together with the frame supporting the rotatable device-mounting-plate are secured to a base-plate. In this way the pivot axis and the axis of rotation are fixed with respect to each other, and with respect to the rectilinear shock or vibration apparatus. A first link-end of a second elongated hinged-link is coupled to a second end of said lever arm. A second link-end of the second hinged-link is coupled to the rotatable device-mounting-plate to thereby constitute the rotary-motion end of the linkage. In this alternative embodiment of the invention the first end of the lever arm is preferably closer to the pivot axis than the second end of the lever arm. Consequently, the lever arm mechanically amplifies shock or vibration coupled to the rotatable device-mounting-plate by the second hinged-link from that shock or vibration applied by the rectilinear shock or vibration apparatus through the first hinged-link to the first end of the lever arm.

These and other features, objects and advantages will be understood or apparent to those of ordinary skill in the art from the following detailed description of the preferred embodiment as illustrated in the various drawing figures.

BRIEF DESCRIPTION OF THE DRAWINGS

FIG. 1 is a plan view of a rotational shock/vibration fixture in accordance with the present invention depicting a rigid box that encloses a device-mounting-plate, a frame for supporting the box for movement about an axis of rotation, and a linkage which couples the box to a rectilinear shock or vibration apparatus;

FIG. 2 is an exploded elevational view of the box and frame taken along the line 2—2 of FIG. 1;

FIG. 3 is an elevational view of a hinged-link portion of the linkage taken along the line 3—3 of FIG. 1;

FIG. 4 is an exploded elevational view of a lever arm portion of the linkage taken along the line 4—4 of FIG. 1; and FIG. 5 is a plan view of an alternative embodiment of the rotational shock/vibration fixture of the present invention.

DETAILED DESCRIPTION OF THE PREFERRED EMBODIMENT

FIG. 1 depicts a rotational shock/vibration fixture in accordance with the present invention referred to by the general reference character 20. As illustrated in FIGS. 1 and 2, the rotational shock/vibration fixture 20 includes a lightweight, rigid box 22 which is supported for movement about a rotation axis 24 by a frame 26. Internally, walls of the box 22 are fabricated from a light-weight honeycomb material (not illustrated in any of the FIGs.), and have an outer surface 28 that is formed by sheets of aluminum. As illustrated in FIG. 2, the box 22 includes two device-mounting-plates 32 for receiving the device to be tested with rotational shock or vibration. The device-mounting-plates 32 are oriented perpendicular to the rotation axis 24.

Formed into an upper surface 34 and into a diametrically opposed lower surface 36 of the outer surface 28 of the box 22 are frustro-conically shaped bearing-journal apertures 38. The frame 26 includes a one and one-half (1½) inch thick aluminum H-shaped base 42 and a one and one-half (1½) inch thick aluminum removable upper plate 44. Formed into a lower surface 46 of the upper plate 44 are U-shaped grooves 48 which mate with projecting upper-surfaces 52 of trapezoidally-shaped side walls 54 of the frame 26. The upper plate 44 is secured onto the projecting upper-surfaces 52 by a plurality of fasteners 56 which extend through apertures 57 piercing the upper plate 44 to thread into the side walls 54. Projecting respectively from the base 42 and from the upper plate 44 about the rotation axis 24 are tapered roller-bearings 58. Accordingly, the assembled frame 26 encircles the box 22, and supports the box 22 for movement about the rotation axis 24 on the tapered roller-bearings 58 that are respectively interposed between each of the bearing-journal apertures 38 and the base 42 and upper plate 44 of the frame 26. By appropriately spacing the upper plate 44 to provide a slight gap between the projecting upper-surfaces 52 of the side walls 54 and a mating surface of the U-shaped grooves 48, a controlled pre-load may be established on the tapered roller-bearings 58 which avoids buckling the honeycomb box 22.

To ensure rigidity of the frame 26, one and one-half (1½) inch thick aluminum side walls 54 are secured by welding to the H-shaped base 42. A pair of one and one-half (1½) inch thick aluminum, triangularly-shaped buttresses 62 are also secured by welding to each of the side walls 54 and to the base 42. The frame 26 is secured onto a base-plate 64 by a plurality of fasteners 66 which extend through apertures 68 piercing the H-shaped base 42 to thread into the base-plate 64. Securing the frame 26 to the base-plate 64 fixes the rotation axis 24 with respect to a rectilinear shock or vibration apparatus 72 depicted in FIG. 1.

In addition to being supported from the frame 26 by the tapered roller-bearings 58, the box 22 is also coupled to the frame 26 by a pair of coil springs 74. To attach the coil springs 74 to the box 22, a spring plate 76 is secured on the outer surface 28 of the box 22 adjacent to the lower device-mounting-plate 32 as illustrated in FIG. 2. The spring plate 76 includes diametrically opposed ears 78 that are pierced respectively by apertures 82. The apertures 82 respectively receive hooks 84 located at one end of each of the coil springs 74. Similarly, threaded studs 85 having flattened ends pierced by apertures 86 screw into one of a horizontal row of threaded apertures 87 that pierce both side walls 54. Threaded onto each threaded stud 85 is a lock nut 88 which is tightened against the side wall 54 to prevent rotation of the threaded stud 85. The apertures 86 project inward from the side walls 54 to respectively receive hooks 84 of the coil springs 74. Stretching of the coil springs 74 between the apertures 86 and the apertures 82 establishes a rest orientation for the box 22. By selecting different pairs of the threaded apertures 87 in the side walls 54 the rest orientation of the box 22 with respect to the frame 26 may be set at various different angles. The box 22 returns to this rest orientation if no external force is applied to the box 22. Each of the coil springs 74 is encircled with a dampening sheath of elastomeric material 92, preferably a rubber electrical insulating tape, to diminish vibration of the coil springs 74.

Referring again to FIG. 1, a linkage 102 extends between an armature 104 of the rectilinear shock or vibration apparatus 72 and a rear wall 106 of the box 22 located distal from the spring plate 76. The rear wall 106 completely closes one side of the box 22 leaving the box 22 open only adjacent to the spring plate 76. The linkage 102 includes an elongated first hinged-link 112 having a first link-end 114 which is coupled to the armature 104 of the rectilinear shock or vibration apparatus 72. The first link-end 114 constitutes a linear-motion end of the linkage 102.

The linkage 102 also includes a lever arm 116 that is encircled and supported by a lever-arm frame 118 to permit movement of the lever arm 116 about a pivot axis 122. The lever-arm frame 118 is secured to the base-plate 64 by threaded fasteners 124. The lever arm 116 is supported within the lever-arm frame 118 for rotation about the pivot axis 122 by tapered roller bearings (not depicted in any of the FIGs.) which are similar to the tapered roller-bearings 58, and that are received into frustro-conically shaped bearing-journal apertures (not depicted in any of the FIGs.) that are formed into the lever arm 116 and which are similar to the bearing-journal apertures 38. A first end 126 of the lever arm 116 is coupled to a second link-end 128 of the first hinged-link 112.

An elongated second hinged-link 132 having a first link-end 134 is coupled to a second end 136 of the lever arm 116. The second hinged-link 132 has a second link-end 138 which is secured to the rear wall 106 of the box 22. The second link-end 138 constitutes the rotary-motion end of the linkage 102.

The first end 126 of the lever arm 116 is preferably closer to the pivot axis 122 than the second end 136 of the lever arm 116. Accordingly, the lever arm 116 mechanically amplifies amplitude of shock or vibration coupled to the device-mounting-plates 32 by the second hinged-link 132 from that shock or vibration applied to the first end 126 of the lever arm 116 by the rectilinear shock or vibration apparatus 72 through the first hinged-link 112. Mechanical amplification of shock or vibration applied to the lever arm 116 by the rectilinear shock or vibration apparatus 72 reduces the possibility of damaging the armature 104 of the rectilinear shock or vibration apparatus 72 by excessive acceleration and/or displacement of the armature 104.

As illustrated in FIG. 3, both the first hinged-link 112 and the second hinged-link 132 include a pair of U-shaped yokes 142 disposed respectively at opposite link-ends of the hinged-links 112 and 132 for coupling the hinged-links 112 and 132 into the linkage 102. The yoke 142 at one end of each hinged-link 112 and 132 respectively constitutes the first link-ends 114 and 134. The yoke 142 at the opposite end of each hinged-link 112 and 132 respectively constitute the second link-ends 128 and 138. Several apertures 144 pierce each of the yokes 142. The apertures 144 permit securing one yoke 142 of the hinged-links 112 and 132 respectively to the armature 104 of the rectilinear shock or vibration apparatus 72, and to the second end 136 of the lever arm 116 by threaded fasteners (not illustrated in any of the FIGs.). Similarly, the apertures 144 permit securing the other yoke 142 of the hinged-links 112 and 132 to the first end 126 of the lever arm 116, and to the rear wall 106 of the box 22 by threaded fasteners (not illustrated in any of the FIGs.).

Each hinged-link 112 and 132 includes three elongated rods 152 each of which has rod-ends 154 disposed at opposite ends of the rod 152. Each of the rod-ends 154 is preferably formed by a rod-end marketed by Alinabal, Inc. of Milford, Conn. Each rod-end 154 is secured to one of the yokes 142 by a pin 156 which passes through apertures 158 piercing both the yokes 142 and the rod-ends 154. The structure of the rod-ends 154 permits the yokes 142 to rotate with respect to the rods 152 about the pins 156. A central portion 162 of each rod 152 has threads 164 formed at both ends which respectively screw into the rod-ends 154. The threads 164 of each central portion 162 are formed so that rotation of the central portion 162 with respect to the rod-ends 154 either lengthens or shortens the rod 152. Tightening a jamb nut 166 mounted on each of the threads 164 against the corresponding rod-end 154 permits locking each of the rods 152 at the length to which it is adjusted. The adjustable length rods 152 of each hinged-link 112 and 132 are preferably adjusted so the outer pair of the three rods 152 is taut while the middle rod 152 is compressed. While this is the preferred configuration for the rods 152, the rods 152 may alternatively be configured with the outer pair of rods 152 compressed while the middle rod 152 is taut. In this way the hinged-links 112 and 132 and the lever arm 116 provide a reduced-backlash linkage 102 which, in principle, should have no backlash.

Referring again to FIG. 1, the linkage 102 preferably includes a dampener 172 that is secured to the base-plate 64. As illustrated in FIG. 4, the dampener 172 includes a block 174 that is pierced by apertures 176 adapted to receive threaded fasteners (not illustrated in any of the FIGs.) for securing the block 174 to the base-plate 64. A pair of parallel grooves 178 extend across an upper surface 182 of the block 174. The grooves 178 respectively receive friction pads 184 preferably formed from a felt material. A similar pair of parallel grooves 186 are also formed in an upper surface 188 of the lever arm 116. The grooves 186 also receive friction pads 192 preferably formed from a felt material.

A cover plate 194 extends over the block 174 and is joined to the block 174 by end plates 196. A pair of fasteners 198 passing through circular apertures 202, that respectively pierce the end plates 196, thread into the cover plate 194. Analogously, pair of fasteners 204 passing through oval apertures 206, that also respectively pierce the end plates 196, thread into the block 174. The end plates 196, the fasteners 198 and the fasteners 204 secure the cover plate 194 and the end plates 196 onto the block 174 thereby encircling the lever arm 116. The oval apertures 206 piercing the end plates 196 permit adjusting the distance between the block 174 and the cover plate 194. Adjustment of this distance permits establishing a controlled engagement of the friction pads 184 of the dampener 172 with the lever arm 116, and of the friction pads 192 inserted into the grooves 186 of the lever arm 116 with the cover plate 194. Preferably the friction pads 184 and 192 are infused with a lubricant such as oil to permit smooth motion of the lever arm 116 from side-to-side within the dampener 172. Accordingly, frictional engagement between the lever arm 116 and the dampener 172 diminishes undesirable oscillations of the lever arm 116 about the pivot axis 122.

Referring again to FIG. 1, to establish a moment about the rotation axis 24 for a force applied by the linkage 102 to the box 22, the second link-end 138 of the second hinged-link 132 attaches to the rear wall 106 of the box 22 along a line 212 that passes through the pin 156 in the second link-end 138 and is perpendicular to a line 214 that passes through the rotation axis 24. Configuration of the rotational shock/vibration fixture 20 prior to applying any shock or vibration to the device-mounting-plates 32 preferably cocks the box 22 at an angle 216 of approximately 30° with respect to the frame 26. Such a configuration preferably offsets the line 212 to one side of the rotation axis 24 by one (1) to two (2) inches to facilitate rotation of the box 22 about the rotation axis 24. Cocking of the box 22 at different angles with respect to the frame 26 by screwing the threaded studs 85 into different threaded apertures 87 formed into the side walls 54 permits adjusting the angle 216 thereby increasing or decreasing the moment for shock or vibration about the rotation axis 24.

Configured in the manner described thus far, the rotational shock/vibration fixture 20 of the present invention is capable of applying controlled shock or vibration to the device-mounting-plates 32 having a rotational acceleration of up to 15,000 radians/sec$^2$. At a distance of approximately four and one-quarter (4¼) inches from the rotation axis 24, such a radial acceleration applies a force that is approximately 170 times greater than the force of gravity, i.e. 170 g's, to a device under test.

FIG. 5 depicts an alternative configuration for the rotational shock/vibration fixture 20 in which the lever arm 116 and the second hinged-link 132 are omitted from the linkage 102 so the second link-end 128 of the first hinged-link 112 connects directly to the rear wall 106 of the box 22. While the configuration depicted in FIG. 5 increases the possibility of damaging the armature 104 of the rectilinear shock or vibration apparatus 72 by excessive acceleration and/or displacement of the armature 104, because the configuration depicted in FIG. 5 reduces the mass of the linkage 102 under appropriate circumstances this alternative configuration may be used advantageously for short pulse width shocks, and for higher frequency vibration testing.

Although the present invention has been described in terms of the presently preferred embodiment, it is to be understood that such disclosure is purely illustrative and is not to be interpreted as limiting. For example, while a pair of coil springs 74 respectively stretching between ears 78 of the box 22 and threaded studs 85 of the frame 26 have been disclosed for establishing the rest orientation of the box 22 with respect to the frame 26, a rotary coil spring, which encircles one of the tapered roller-bearings 58 and which engages the box 22 at one end and the frame 26 at an opposite end, could also be used for establishing the rest orientation of the box 22. While the rotational shock/vibration fixture 20 is preferably used with an electromagnetically excited rectilinear shock or vibration apparatus 72, the rotational shock/vibration fixture 20 may also be used with a hydraulically or pneumatically energized shaker or driver. Consequently, without departing from the spirit and scope of the invention, various alterations, modifications, and/or alternative applications of the invention will, no doubt, be suggested to those skilled in the art after having read the preceding disclosure. Accordingly, it is intended that the following claims be interpreted as encompassing all alterations, modifications, or alternative applications as fall within the true spirit and scope of the invention.

What is claimed is:

1. A rotational shock/vibration fixture that adapts a rectilinear shock or vibration apparatus for applying a rotary shock or vibration to a device undergoing test, the rotational shock/vibration fixture comprising:

a rotatable device-mounting-plate for receiving the device to be tested, said rotatable device-mounting-plate being supported for movement about an axis of rotation that is fixed with respect to the rectilinear shock or vibration apparatus, and is oriented perpendicular to the device; and a linkage for coupling said rotatable device-mounting-plate to the rectilinear shock or vibration apparatus so that rectilinear movement of the rectilinear shock or vibration apparatus induces rotary motion of said rotatable device-mounting-plate about the axis of rotation, said linkage having a linear-motion end that is coupled to the rectilinear shock or vibration apparatus, and a rotary-motion end that is coupled to the rotatable device-mounting-plate.

2. The rotational shock/vibration fixture of claim 1 wherein said rotatable device-mounting-plate is supported within a rigid box, said box being supported for movement about the axis of rotation which remains fixed with respect to the rectilinear shock or vibration apparatus, and said box having an outer surface to which the rotary-motion end of said linkage attaches.

3. The rotational shock/vibration fixture of claim 2 wherein diametrically opposite sides of the outer surface of said box respectively have bearing-journal apertures formed therein, said box being encircled by a rigid frame for supporting said box on bearings that are respectively interposed between each of the bearing-journal apertures and said frame.

4. The rotational shock/vibration fixture of claim 3 wherein said bearings are tapered-roller bearings.

5. The rotational shock/vibration fixture of claim 3 wherein said box is also coupled to said frame by spring means for establishing a rest orientation of said box with respect to said frame, said box returning to the rest orientation when freed from said linkage.

6. The rotational shock/vibration fixture of claim 5 wherein said spring means includes a pair of coil springs respectively stretched between opposite sides of said box and opposite sides of said frame.

7. The rotational shock/vibration fixture of claim 6 wherein each of said coil springs include a vibration dampener for diminishing vibration of said coil spring.

8. The rotational shock/vibration fixture of claim 7 wherein said vibration dampener includes an elastomeric sheath encircling said coil spring.

9. The rotational shock/vibration fixture of claim 1 wherein said linkage coupling said rotatable device-mounting-plate to the rectilinear shock or vibration apparatus employs a structure that reduces mechanical backlash.

10. The rotational shock/vibration fixture of claim 9 wherein the reduced-backlash linkage includes an elongated hinged-link having:

a pair of yokes disposed respectively at opposite ends of said hinged-link, one of said yokes being located at the linear-motion end of said linkage, the other of said yokes being located at the rotary-motion end of said linkage; and at least three elongated rods each of which has rod-ends disposed at opposite ends of said rod, each rod-end being respectively secured to one of said yokes by a pin which passes through apertures piercing both said yoke and the rod-end, at least one of said rods having an adjustable length, the length of said adjustable length rod being fixed so at least one of said at least three rods is taut while at least another of said at least three rods is compressed.

11. The rotational shock/vibration fixture of claim 9 wherein, said rotatable device-mounting-plate is supported for movement about the axis of rotation by a frame that is secured to a base-plate, and wherein said reduced-backlash linkage includes:

a first elongated hinged-link having a first link-end which is coupled to the rectilinear shock or vibration apparatus to thereby constitute the linear-motion end of said linkage;

a lever arm that is supported by a lever-arm frame for rotation about a pivot axis, the lever-arm frame being secured to the base-plate, a first end of said lever arm being coupled to a second link-end of said first hinged-link; and a second elongated hinged-link having a first link-end which is coupled to a second end of said lever arm, and having a second link-end which is coupled to said rotatable device-mounting-plate to thereby constitute the rotary-motion end of said linkage.

12. The rotational shock/vibration fixture of claim 11 wherein said first and said second hinged-link respectively include:

a pair of yokes disposed respectively at opposite link-ends of said hinged-link for coupling said hinged-link into said linkage; and at least three elongated rods each of which has rod-ends disposed at opposite ends of said rod, each rod-end being respectively secured to one of said yokes by a pin which passes through apertures piercing both said yoke and the rod-end, at least one of said rods having an adjustable length, the length of said adjustable length rod being fixed so at least one of said at least three rods is taut while at least another of said at least three rods is compressed.

13. The rotational shock/vibration fixture of claim 11 wherein the reduced-backlash linkage includes a dampener that is secured to the base-plate and frictionally engages said lever arm for diminishing oscillations of said lever arm about the pivot axis.

14. The rotational shock/vibration fixture of claim 11 wherein the first end of said lever arm is closer to the pivot axis than the second end of said lever arm whereby amplitude of shock or vibration coupled to said rotatable device-mounting-plate by said second hinged-link is mechanically amplified from shock or vibration applied to said first end of said lever arm by said rectilinear shock or vibration apparatus through the first hinged-link.

* * * * *